(12) United States Patent
Stach et al.

(10) Patent No.: US 10,722,994 B2
(45) Date of Patent: Jul. 28, 2020

(54) METHOD FOR THE AUTOMATIC DETERMINATION OF THE GEOMETRICAL DIMENSIONS OF A TOOL IN A GEAR CUTTING MACHINE

(71) Applicant: Liebherr-Verzahntechnik GmbH, Kempten (DE)

(72) Inventors: Stefan Stach, Altusried (DE); Andreas Buchenberg, Goerisried (DE); Martin Schoellhorn, Betzigau (DE); Uli Schollenburch, Kempten (DE)

(73) Assignee: LIEBHERR-VERZAHNTECHNIK GMBH, Kempten (DE)

( * ) Notice: Subject to any disclaimer, the term of this patent is extended or adjusted under 35 U.S.C. 154(b) by 3 days.

(21) Appl. No.: 15/861,912

(22) Filed: Jan. 4, 2018

(65) Prior Publication Data
US 2018/0185975 A1    Jul. 5, 2018

(30) Foreign Application Priority Data

Jan. 5, 2017   (DE) ........................ 10 2017 000 072

(51) Int. Cl.
| | |
|---|---|
| B23Q 17/20 | (2006.01) |
| G05B 19/00 | (2006.01) |
| B23Q 17/22 | (2006.01) |
| B23F 23/00 | (2006.01) |
| B23F 23/12 | (2006.01) |
| G05B 19/401 | (2006.01) |
| B23Q 17/24 | (2006.01) |

(52) U.S. Cl.
CPC ............ *B23Q 17/20* (2013.01); *B23F 23/006* (2013.01); *B23F 23/12* (2013.01); *B23F 23/1218* (2013.01); *B23Q 17/22* (2013.01); *B23Q 17/2241* (2013.01); *B23Q 17/2457* (2013.01); *G05B 19/4015* (2013.01); *G05B 2219/36198* (2013.01)

(58) Field of Classification Search
CPC .... B23F 23/006; B23F 23/12; B23F 23/1218; B23Q 17/22; B23Q 17/2241; B23Q 17/2457; G05B 19/4015
See application file for complete search history.

(56) References Cited

U.S. PATENT DOCUMENTS

| | | | | |
|---|---|---|---|---|
| 5,643,065 | A * | 7/1997 | Whitesel | B23Q 16/028 451/403 |
| 5,954,568 | A * | 9/1999 | Wirz | B24B 53/075 125/11.01 |
| 6,257,963 | B1 * | 7/2001 | Thyssen | B23F 21/026 451/253 |

(Continued)

FOREIGN PATENT DOCUMENTS

| | | |
|---|---|---|
| DE | 19901338 C1 | 3/2000 |
| DE | 19928500 A1 | 12/2000 |

(Continued)

*Primary Examiner* — Ronald D Hartman, Jr.
(74) *Attorney, Agent, or Firm* — McCoy Russell LLP

(57) ABSTRACT

The application relates to a method for the automatic determination of the geometrical dimensions of a tool having a machining region in worm thread form, in particular of a grinding worm, in a gear cutting machine, wherein at least one parameter of the tool is automatically detected and/or determined by means of at least one sensor.

13 Claims, 3 Drawing Sheets

(56) References Cited

U.S. PATENT DOCUMENTS

| | | | | |
|---|---|---|---|---|
| 6,290,574 | B1* | 9/2001 | Thyssen | B23F 23/1225 |
| | | | | 451/10 |
| 6,302,764 | B1* | 10/2001 | Wirz | B24B 49/02 |
| | | | | 451/11 |
| 6,379,217 | B1* | 4/2002 | Thyssen | B23F 5/04 |
| | | | | 451/5 |
| 6,491,568 | B1* | 12/2002 | Jankowski | B24B 53/075 |
| | | | | 451/253 |
| 2001/0022098 | A1* | 9/2001 | Wirz | B23F 23/00 |
| | | | | 72/17.3 |
| 2002/0119737 | A1* | 8/2002 | Tan | B23F 23/1225 |
| | | | | 451/47 |
| 2004/0040133 | A1* | 3/2004 | Ronneberger | B23F 5/02 |
| | | | | 29/28 |
| 2012/0213602 | A1* | 8/2012 | Winkel | B23F 23/1218 |
| | | | | 409/61 |
| 2013/0089386 | A1* | 4/2013 | Fong | B23F 21/026 |
| | | | | 409/48 |
| 2013/0280990 | A1* | 10/2013 | Geiser | B23F 5/04 |
| | | | | 451/47 |
| 2015/0338201 | A1* | 11/2015 | Wuerfel | G01B 5/24 |
| | | | | 700/160 |
| 2016/0214194 | A1* | 7/2016 | Wuerfel | B23F 9/02 |
| 2017/0008104 | A1* | 1/2017 | Wuerfel | B23F 19/10 |
| 2017/0008109 | A1* | 1/2017 | Wuerfel | B23F 23/1225 |
| 2017/0008110 | A1* | 1/2017 | Mundt | B23F 23/1225 |
| 2017/0008148 | A1* | 1/2017 | Wuerfel | B24B 53/083 |
| 2017/0087653 | A1* | 3/2017 | Winkel | B23F 19/102 |
| 2018/0128596 | A1* | 5/2018 | Mies | G01B 11/005 |

FOREIGN PATENT DOCUMENTS

| | | |
|---|---|---|
| DE | 102014007646 A1 | 11/2015 |
| JP | 2016078186 A | 5/2016 |

* cited by examiner automatic determination of the geometrical dimensions of a tool having a machining region in worm thread form

FIG. 4

METHOD FOR THE AUTOMATIC DETERMINATION OF THE GEOMETRICAL DIMENSIONS OF A TOOL IN A GEAR CUTTING MACHINE

CROSS REFERENCE TO RELATED APPLICATION

This application claims priority to German Patent Application No. 10 2017 000 072.7, entitled "Method for the Automatic Determination of the Geometrical Dimensions of a Tool in a Gear Cutting Machine," filed Jan. 5, 2017, the entire contents of which is hereby incorporated by reference in its entirety for all purposes.

TECHNICAL FIELD

The present application relates to a method for the automatic determination of the geometrical dimensions of a tool having a machining region in worm thread form, in particular having a grinding worm, in a gear cutting machine as well as to a method for the automated meshing of the tool relative to a toothed workpiece. The application further relates to an apparatus and to a gear cutting machine for carrying out a method in accordance with the application.

BACKGROUND AND SUMMARY

Methods and apparatus are known from the prior art in which grinding worms that are used at high to very high speeds can be dressed using a known and proven profiling process at low speeds and nevertheless have the required exact profile geometry at working speeds, i.e. in the stress condition under centrifugal force.

It is known that the measuring of the grinding worm profile can take place, for example, directly at the grinding worm by means of a contactless measurement system—such as laser optical distance measurement—or indirectly via the grinding and measuring of a sample workpiece. It is furthermore known here to measure the grinding worm profile at a profiled grinding worm that is slightly deformed due to the effect of the centrifugal forces at a working speed.

A multi-stage setting up process is required when setting up a gear cutting machine for machining precut gear workpieces. The geometrical dimensions of the tool first have to be manually determined outside the gear cutting machine or can also be taken from tool data sheets depending on the dimensions. These data subsequently have to be stored in the machine control. Some of these geometrical data change over the course of time with dressable tools—e.g. during dressing—such as the worm diameter or have to be additionally modified with a changed worm diameter to avoid profile errors such as applies, for example, to the lead or to the pressure angle. These data also have to be recorded over the grinding worm usage time so that they are available again on a repeat changing in of the tool.

In a further step in the setting up process, the location of the tool threads relative to the rotational position of the tool axis has to be stored in the control. This information and the position of the tool tooth spaces relative to the rotational position of the workpiece axis are required to be able to carry out an error-free, generator-coupled gear machining process. These further process steps are frequently called meshing.

In the subsequent machining process, only the location of the workpiece tooth spaces of each workpiece to be machined then has to be determined by means of a meshing sensor and the matching rotational position of the workpiece axis has to be stored. The rotational position of the workpiece axis is then synchronized with the rotational position of the tool axis in the machining process so that the tool threads can dip into the tooth spaces without collision and the workpiece can be machined in a generator-coupled manner.

To date, some of this total process is disadvantageously carried out manually or only semiautomatically despite the already highly automated gear cutting processes. The operator has thus previously had to position the tool relative to the tooth space of a workpiece during the first meshing after the substantially manual input of the geometrical parameters of the tool. For this purpose, the tool is manually rotated about its axis of rotation for so long until the teeth of the tool can dip into the tooth spaces without collision. The tool is subsequently delivered and a respective contact is established between the left and right tooth flanks of the tool by shifting or rotating the tool and the measured value for this is recorded. The tooth center position of the tool relative to the tooth space can be calculated from these contact dimensions and the rotational position of the tool at which it can dip into a known tooth space without collision can be determined therefrom.

All these manual worksteps bring about disadvantages such as increased dressing times and, due to the manual operation, possibly occurring incorrect settings of the gear cutting machine.

Only the measurement of the grinding worm profile shape has previously been known at the working speed of the grinding worm. What is not known, however, is using a contactless measurement system for determining various geometrical parameters of a tool having a machining region of worm thread shape. Tool parameters can be fully automatically determined and incorrect inputs can thus be prevented by the automated determination of the different geometrical dimensions of a tool which the gear cutting machine requires for the workpiece machining.

The tool can advantageously be a grinding worm. Other tools of similar design can, however, also be subjected to the method such as peel hobs when in so doing the special feature of the worm threads interrupted by the gashes are taken into account in the parameter determination.

It is therefore an object of the application to carry out a fully automatic determination of process-relevant geometrical parameters of the grinding worm, to determine an automated determination of the location of the worm thread position relative to the rotational position of the grinding worm about its axis and to enable an automatic meshing of the grinding worm in the gear teeth of a workpiece.

This object is achieved in accordance with the application by a method having the features including the automatic determination of at least one parameter of a grinding worm of a gear cutting machine, said method being including that at least one parameter of the grinding worm can be automatically detected and/or determined by means of at least one sensor.

"Parameter" can here be understood as different geometrical dimensions such as the worm diameter, the worm width, the lead angle and lead direction, but also the number of starts of the grinding worm. A "parameter" in the sense of the application can, however, also include other aspects.

The "meshing of the grinding worm" can mean that a so-called rolling engagement is realized between the grinding worm and a toothed workpiece. An exact positioning and alignment of the worm thread or, with multithread grinding worms, the worm threads of the grinding worm and relative to the teeth of the toothed workpiece are therefore an absolute necessity.

The basic requirement for the method is first a calibration process in which the exact location of the sensor with respect to the grinding wheel and its positioning within the gear cutting machine is determined and stored. This is in particular the case since the sensor cannot necessarily be arranged centrally with respect to the grinding worm or otherwise in a known or defined position and the method would thus not deliver any usable results with an unknown position of the sensor.

In accordance with the application, the parameters can thus be determined faster and more exactly in an automated manner. This method can likewise provide an inexpensive and grime-resistant possibility for determining the parameters of the grinding worm. This provides the advantage with respect to the initially described prior art that incorrect settings by the machine operator can be reduced and a faster tool change can likewise be realized.

It is furthermore advantageous that it is possible to react to temperature changes or temperature-induced changes of the gear cutting machine geometry and that object shifts, etc. can be detected by means of the sensor and can be compensated where necessary.

Advantageous embodiments of the application form the subject of the dependent claims.

In accordance with a first embodiment, the pitch, the module, the diameter, the lead and/or the location of the worm in the tool holder and its outer dimensions in the V direction can be determined by a calculatory processing of the detected and/or determined values.

In the method in accordance with the application, a calibration process can be carried out in a manner known per se where required to determine the location of the sensor with respect to the grinding worm and/or to the positioning within the gear cutting machine. The calibration process here means a step that could be carried out every time on the carrying out of the method in accordance with the application before the further steps or before the further step or that is alternatively carried out on a first carrying out of the method before the further steps and that can be omitted in following applications of the method. The location of the sensor with respect to its positioning within the gear cutting machine is inter alia determined in the calibration process. The sensor here does not have to be literally arranged within the gear cutting machine, but can rather only be part of the structure of the gear cutting machine and can thus, for example, be arranged at one of the outer sides of the gear cutting machine.

In a further embodiment, the grinding worm is moved to a predefined reference point, the alignment of the A axis to 0°, to determine the number of starts. A plurality of revolutions, in particular three revolutions, of the grinding worm about the B axis is thereupon subsequently detected by the sensor.

Provision can be made in a further embodiment of the application that at least one respective measurement is carried out by means of the sensor above and below the axis center of the grinding worm to determine the lead direction and/or that the grinding worm is rotated and the lead direction is determined by a mutual displacement of the sensor and/or of the grinding worm in the V direction. In the first-named variant, a measurement is, for example, carried out above and below the center and in particular spaced apart from the center of the grinding worm in an axial direction, with it being possible subsequently to calculate and thus fix the lead direction of the grinding worm in a calculatory manner by the determination of these two points on the grinding worm. In the second-named variant, the determination of the lead direction is carried out such that the lead direction is determined by means of a rotation of the grinding worm and of a simultaneously occurring relative displacement in a specific V direction. With a previously correctly assumed lead direction, the signal obtained remains constant since the sensor moves synchronously with the worm thread. The assumption of the direction can thus be confirmed. If the signal drops because the sensor has moved relative to the worm thread, a conclusion can be drawn from this that the lead direction was incorrectly assumed and the direction of movement of the sensor has to be adapted accordingly. The lead direction can likewise be accordingly determined by means of the sensor.

In accordance with a further embodiment, the grinding worm can be traveled along its longitudinal axis direction or V axis direction or V direction to mesh the grinding worm, with the position of the teeth along the V axis direction being determined by means of the sensor and the center position between two teeth being calculated or determined from this.

In accordance with a embodiment, the sensor can be an optical sensor, an inductive sensor, a capacitive sensor, or an ultrasound sensor and can work in an analog or digital manner. The combination of the different principles and, alternatively or additionally, an embodiment of the application with more than one sensor is accordingly conceivable, with the sensors also being able to be configured differently here. This provides the advantage that a respective sensor can be used in dependence on the material of the grinding worm to be detected and a variable embodiment of the method is accordingly possible.

In an embodiment, a determination of different parameters by means of the sensor is possible for the automatic meshing of asymmetrical profiles. This provides the advantage that the meshing of a grinding worm having an asymmetric worm profile can likewise be carried out automatically and reliably.

The application is further directed to a gear cutting machine for carrying out one of the aforesaid methods, wherein a sensor is provided for scanning a grinding worm.

Further features, details, and advantages of the application are explained with reference to the embodiment shown by way of example in the Figures.

BRIEF DESCRIPTION OF THE FIGURES

FIG. 4 shows an example method carried out by an example embodiment of the disclosed system.

DETAILED DESCRIPTION

Figure 1:
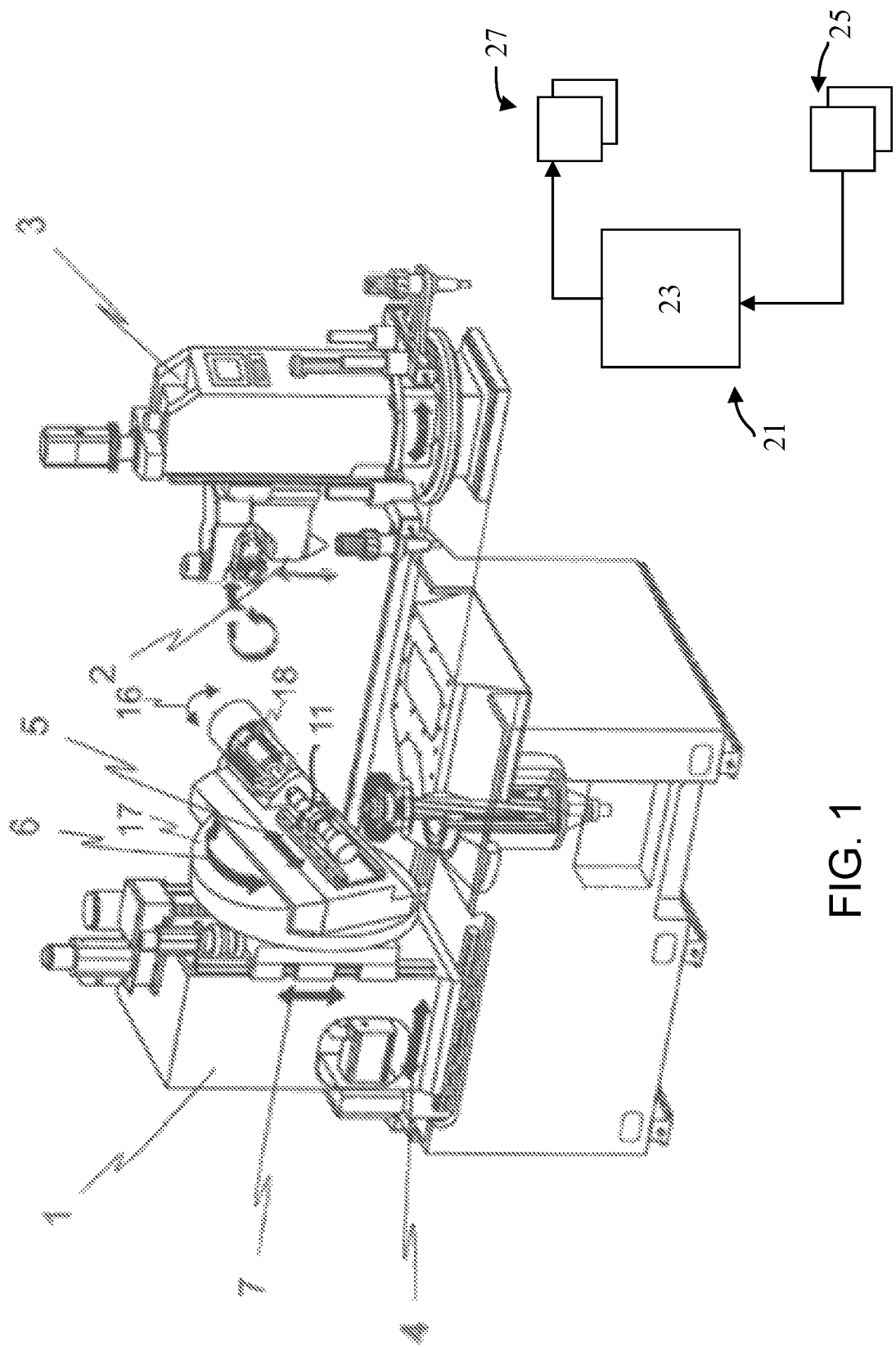
FIG. 1 shows a grinding apparatus in accordance with the prior art.

FIG. 1 shows a grinding apparatus in accordance with the prior art. The axes of a grinding apparatus can in particular be seen by way of completeness and for understanding in FIG. 1. A machine column 1, and horizontally spaced apart therefrom, a counter-column 3 are shown in the left hand region of the gear cutting machine. A machining head 17 having a shift axis 5 (V axis) and a drive motor 18 for receiving a grinding tool 11 can be traveled vertically in the direction of a Z axis 7 along the machine column 1. An installation location 2 of the sensor 8 provided in accordance with the application can lie in the region of the counter-column 3 of the gear cutting machine known per se. Reference is made for the description of the application both to FIG. 1 and to the following FIGS. 2 and 3 that show details of the application that are not shown in the representation of the apparatus of the category in accordance with FIG. 1.

Care must be taken on the carrying out of the calibration process that the A axis 6 of the grinding worm 11 is aligned to 0°. For this purpose, the grinding worm 11 can, for example, be arranged or positioned horizontally, for which purpose it can be pivoted accordingly about the A axis 6. This provides the advantage that a fixed reference value is present. The position of the sensor 8 and its switching point can then be automatically determined. The grinding worm 11 is shifted in the Z direction until the sensor 8 detects the upper part of the grinding arbor 12. It is then again shifted until the sensor 8 detects the lower part of the grinding arbor 12. The sensor height relative to the worm axis can be calculated by averaging from these two stored values. The axial distance of the sensor 8 from the grinding worm can be determined in a similar manner in that the grinding arbor 12 is vertically traveled for so long until the largest diameter at the grinding arbor 12 has been reached. Once the diameter of the grinding arbor 12 is no longer changed in the machining, the sensor distance from the center tool axis can be calculated with the aid of this diameter and the sensor signal.

How far the sensor 8 has been shifted in the V direction from the machine center (tool center) can be determined as follows: The grinding worm 11 is shifted in the V direction, starting from a specific start position, until the sensor 8 detects the start (the end) of the grinding worm 11 on the main bearing side (HL). The distance measure between the main bearing and the grinding worm is known via the construction design of the grinding arbor. How far the sensor 8 has been displaced out of the machine center can be calculated from this V value. To determine the switching point of the sensor 8, the grinding worm center 11 is traveled to the level of the sensor. The grinding worm 11 is removed from the sensor 8 in the direction of the X axis 4 and is subsequently brought closer to it again until the sensor 8 detects the grinding arbor 12. The value to which the X axis 4 has to be set so that the switching point of the sensor 8 is between the dedendum and the addendum of the teeth of the grinding worm 11 can be calculated from this.

In addition, to determine the length of the grinding worm 11, it is shifted along the V direction starting from the main bearing, with the worm start first being detected on the main bearing side by the switching signal of the sensor. The worm width can be calculated from the path difference at that moment when the switching signal of the sensor indicates the end of the worm.

The method in accordance with the application likewise enables a determination of the number of starts of the grinding worm 11. To be able to determine the number of starts, the A axis 6 also has to be aligned to 0° here, with 0° being able to mean a horizontal alignment of the grinding worm 11. The sensor here is aligned to the worm center and to the matching switching distance for detecting the worm threads.

The sensor 8, that is advantageously optical, detects the change of the switching signal on three revolutions of the grinding worm 11 about the B axis 16. Due to the worm lead and to the rotation of the grinding worm, the worm threads move in the V direction and in so doing generate a specific number of switching signals. Since the respective teeth each have positive and negative flanks, the respective number of starts of the grinding worm 11 can be determined using the switching signals. Since two signals are generated per tooth, the number of worm threads can be determined using the number of received switching signals. The number of switching signals is multiplied accordingly with multi-thread grinding worms. On a rotation of the grinding worm 11, a rise in the tooth flank is called a positive flank and a fall of a tooth flank is called a negative flank.

A total of 18 signals can thus be achieved or measured, for example, with a 3-thread grinding worm 11. Said signals can be derived in that nine teeth are taken into account with three revolutions of the grinding worm 11 and a conclusion can be drawn on the total number of 18 signals with a three-thread grinding worm on the basis of the respective two signals per tooth. The procedure is the same with a 2-thread grinding wheel 11 in which a total of 12 signals can be measured and with a 1-thread grinding wheel 11 in which a total of 6 signals can be measured.

The meshing process is always carried out when the machine or a corresponding control/regulation system 21 of the machine is not aware of the location of the worm threads with respect to the rotational position of the grinding worm 11. This is the case, for example, when the grinding worm 11 has been replaced.

The control/regulation system 21 of the machine may include a controller 23 with instructions stored therein to carry out methods, such as the methods described herein. The system may include the controller 23 with sensors, such as represented by sensors 25, and actuators, such as represented by actuators 27. The control system may be included within as an integral part of the machine 1. The actuators may be various actuators such as those described herein, such as motors, drives, etc. The sensors may be various sensors, such as the sensors described herein including position sensors, speed sensors, temperature sensors, etc. The methods described herein may be stored via instructions or code stored in a memory of the control system.

An exact positioning of the grinding worm 11 with respect to the workpiece is absolutely necessary in the grinding process. To reestablish the so-called rolling engagement on a tool change, the tool has to date been manually or semiautomatically rotated about its axis of rotation until the teeth of the grinding worm 11 protrude into the tooth spaces of the gear. The method in accordance with an embodiment of the present application now provides the option by means of the optical sensor 8 of measuring the grinding worm 11 along its longitudinal axis by traveling along the V axis 5 and thus of calculating the location of the teeth along the V axis 5 by means of the machine control and thus of dispensing with the manual or semiautomatic meshing process.

The grinding worm 11 can thus be automatically meshed in the workpiece or relative to the workpiece.

Further parameters such as the pitch, the module, the lead, the diameter of the grinding worm 11, etc. can be determined by the further determined values by calculation. The pitch is thus, for example, calculated as the distance between two switching signals of a rising or falling worm thread flank in conjunction with the number of worm threads. The module thus results from the determined pitch divided by $\pi$. The determination of the lead is likewise based on a formula in accordance with which the module is multiplied by the thread.

The use of different kinds of sensors is possible for the method in accordance with the application in dependence on the required accuracies and conditions such as the tool material and the conditions of use. The following can be used Optical sensors
Inductive sensors
Capacitive sensors
Ultrasound sensors The sensors can be analog or digital here. This must be taken into account accordingly in the evaluation of the measurement signals.

It is conceivable likewise to realize the method in accordance with the application with asymmetrical profiles by means of an analog optical sensor 8. It applies here that in the evaluation of the sensor signals, the direction of approach of the teeth in the direction toward the sensor must be taken into account and, where necessary, more signal points must be included in the calculation.

In addition to the use of the method in accordance with the application in a gear cutting machine, the method can also be used with further worm-shaped tools, for example in skive hobbing. However, the location of the number of gashes of the hob and its effect on the signal evaluation also has to be taken into account here.

Figure 2:
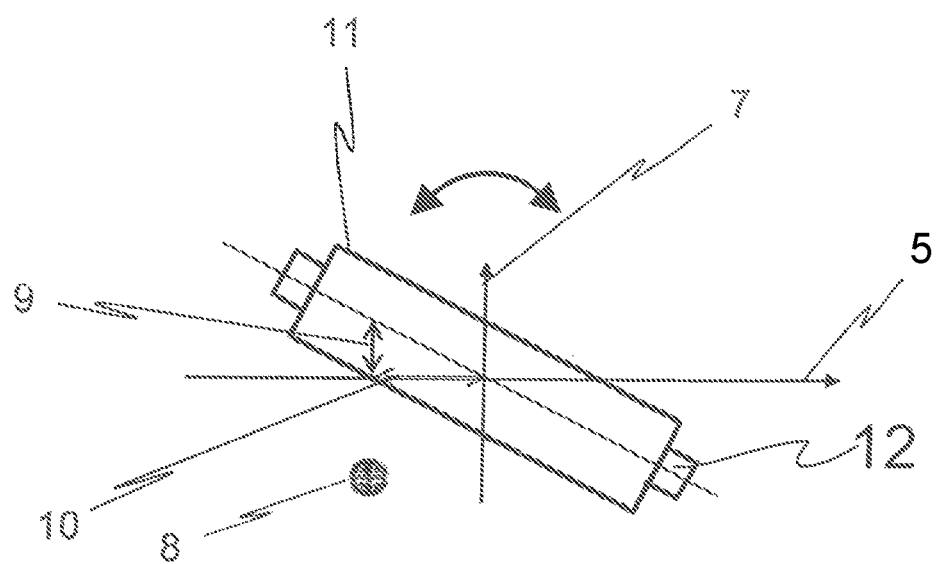
FIG. 2 shows a schematic representation of an inclined grinding worm and of a sensor provided in accordance with the application.

FIG. 2 shows a schematic representation of the inclined grinding worm 11 with the optical sensor 8. The Figure shows that the sensor is not attached above the machine center in this case, whereby a mathematical correction calculation is necessary in the calculation as a Z correction 9 and as a V shift 10. The consideration of these corrections has been carried out on the measurement of the number of starts and of the number of teeth and on the meshing.

Figure 3:
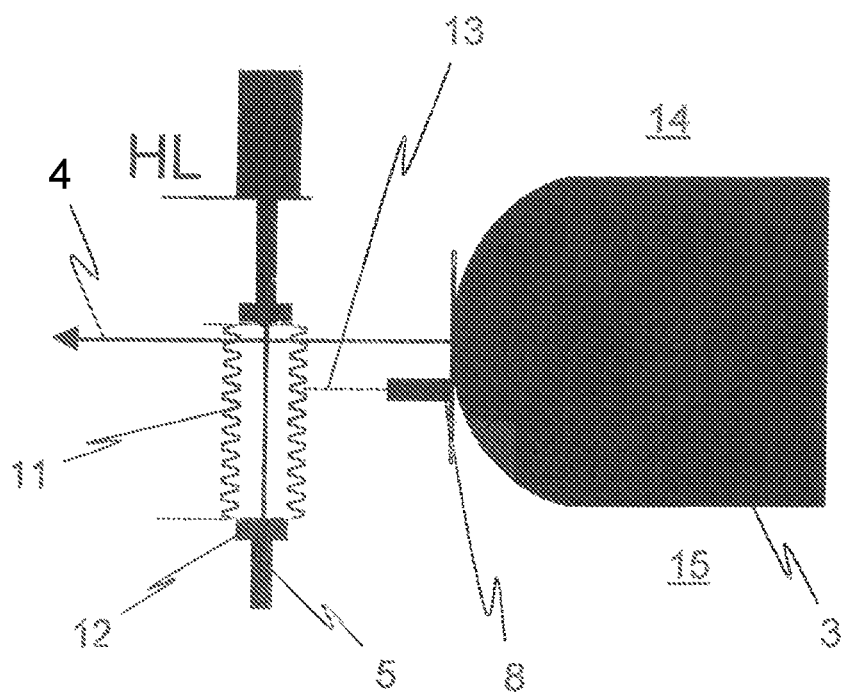
FIG. 3 shows a schematic representation of a grinding worm with a grinding arbor, counter-column and optical sensor.

FIG. 3 shows a schematic representation of a grinding worm 11 with a grinding arbor 12 and a counter-column 3 with an arranged optical sensor 8. How the arrangement in accordance with the application of the optical sensor 8 with respect to the grinding wheel 11 should be realized can be recognized. A laser beam 13 can in particular be emitted along the X axis 4 by the sensor here. The sensor 8 can be arranged between an operating side 15 and a counter-operating side 14 of the gear cutting machine or of the counter-column 3.

FIG. 4 shows an example method of the present application and may further include any of the additional method actions described herein.

REFERENCE NUMERAL LIST 1 machine column
2 installation location of the optical sensor
3 counter-column
4 X axis
5 V axis
6 A axis
7 Z axis
8 optical sensor
9 Z correction
10 Y shift
11 grinding worm
12 grinding arbor
13 laser beam
14 counter-operating side
15 operating side
16 B axis
17 machining head
18 drive motor

The invention claimed is:

1. A method for automatic determination of geometrical dimensions of a tool having a machining region in worm thread form in a gear cutting machine, comprising:
   automatically detecting and/or determining at least one parameter of the tool which the gear cutting machine requires for a subsequent workpiece machining, via at least one sensor,
   wherein a pitch, a module, a diameter, a worm width, a worm thread lead, and/or a V position of the tool, including of a grinding worm is/are determined automatically via a calculators processing of the detected and/or determined parameters.

2. The method in accordance with claim 1, wherein a position of the tool within the gear cutting machine and main geometrical dimensions including tool length, tool diameter, and/or a number of starts of the tool, and/or a lead direction of the tool are determined.

3. The method in accordance with claim 2, wherein a calibration process is carried out to determine a location of the sensor with respect to the tool, including the grinding worm, and/or with respect to the positioning of the tool within the gear cutting machine.

4. The method in accordance with claim 1, wherein an alignment of the tool to a predefined reference point, including an alignment of an A axis to 0°, is carried out for determining a number of starts, and subsequently the sensor detects a plurality of revolutions, including three revolutions, of the tool, including of the grinding worm, about a B axis.

5. The method in accordance with claim 1, wherein at least one respective measurement is carried out for determining a lead direction via the sensor above and below a center axis of the tool, including of the grinding worm.

6. The method in accordance with claim 1, wherein the tool is rotated and a lead direction is determined by a mutual shift of the sensor and/or of the tool in a V direction.

7. The method in accordance with claim 1, wherein the method includes meshing the tool, including the grinding worm, based on the determined parameter, including traveling the tool along a longitudinal direction or V axis direction or V direction of said grinding worm, with a position of teeth along the V axis direction being determined by means of the sensor.

8. The method in accordance with claim 1, wherein the sensor is configured as one or more of an inductive sensor, a capacitive sensor, and/or an ultrasound sensor, with the sensor being an analog and/or a digital sensor.

9. The method in accordance with claim 1, wherein a determination of different parameters takes place via the sensor; the method further comprising automatically meshing asymmetrical profiles based on the determination of the different parameters.

10. A gear cutting machine for carrying out the method in accordance with claim 8, wherein a sensor for scanning a grinding worm is provided at the gear cutting machine.

11. A gear cutting machine for carrying out the method in accordance with claim 1, wherein the tool having the machining region in worm thread form includes a grinding worm.

12. A method, comprising:
   automatically determining geometrical dimensions of a tool having a machining region in worm thread form, including a grinding worm in a gear cutting machine, including detecting and/or determining at least one parameter of the tool automatically via a controller having instructions stored therein, the instructions determining the parameter based on at least one sensor, the controller adjusting an actuator of the gear cutting machine based on the determined/detected parameter according to further instructions, and subsequently machining a workpiece using the tool, wherein a pitch, a module, a diameter, a worm width, a worm thread lead, and/or a V position of the tool, including of the grinding worm is/are determined automatically via a calculatory processing of the detected and/or determined parameters.

13. A method for automatic determination of geometrical dimensions of a tool having a machining region in worm thread form in a gear cutting machine, comprising:

detecting and/or determining at least one parameter of the tool automatically via at least one sensor;

wherein a pitch, a module, a diameter, a worm width, a worm thread lead, and/or a V position of the tool, including of a grinding worm is/are determined automatically via a calculatory processing of the detected and/or determined parameters;

wherein at least one respective measurement is carried out for determining a lead direction via the sensor above and below a center axis of the tool, including of the grinding worm.

* * * * *